(12) United States Patent
Zhu et al.

(10) Patent No.: US 12,570,862 B2
(45) Date of Patent: Mar. 10, 2026

(54) CARBON SUPPORTED SURFACE FUNCTIONALIZED SILVER NANOPARTICLES FOR INK/ELECTRODES/MEA

(71) Applicant: GENESEE VALLEY INNOVATIONS, LLC, Santa Clara, CA (US)

(72) Inventors: Yujie Zhu, Mississauga (CA); Yulin Wang, Oakville (CA); Kurt I. Halfyard, Mississauga (CA); Edward G. Zwartz, Mississauga (CA); Robert Claridge, Cambridge (CA); Benjamin Knapik, Port Moody (CA); David Lawton, Burlington (CA)

(73) Assignee: Genesee Valley Innovations, LLC, Santa Clara, CA (US)

( * ) Notice: Subject to any disclaimer, the term of this patent is extended or adjusted under 35 U.S.C. 154(b) by 690 days.

(21) Appl. No.: 17/811,003

(22) Filed: Jul. 6, 2022

(65) Prior Publication Data

US 2024/0010850 A1     Jan. 11, 2024

(51) Int. Cl.

| | |
|---|---|
| *C09D 5/24* | (2006.01) |
| *C09D 11/033* | (2014.01) |
| *C09D 11/037* | (2014.01) |
| *C25B 11/054* | (2021.01) |
| *C25B 11/081* | (2021.01) |
| *B82Y 30/00* | (2011.01) |
| *B82Y 40/00* | (2011.01) |

(52) U.S. Cl.
CPC .............. *C09D 5/24* (2013.01); *C09D 11/033* (2013.01); *C09D 11/037* (2013.01); *C25B 11/054* (2021.01); *C25B 11/081* (2021.01); *B82Y 30/00* (2013.01); *B82Y 40/00* (2013.01)

(58) Field of Classification Search
None
See application file for complete search history.

(56) References Cited

U.S. PATENT DOCUMENTS

| | | | | |
|---|---|---|---|---|
| 2003/0064265 A1* | 4/2003 | Hampden-Smith | ......................... | C09K 11/7797 204/252 |
| 2011/0305821 A1* | 12/2011 | Wu | ...................... | C09D 11/322 252/519.2 |
| 2017/0263945 A1* | 9/2017 | Li | ........................ | H01M 8/0239 |
| 2020/0284749 A1* | 9/2020 | Nicholas | ................ | B41M 3/006 |
| 2024/0010855 A1* | 1/2024 | Claridge | ................. | B22F 1/102 |
| 2024/0011171 A1* | 1/2024 | Zhu | .......................... | B01J 35/45 |
| 2024/0102186 A1* | 3/2024 | Zhu | ........................ | C25B 11/052 |
| 2024/0254642 A1* | 8/2024 | Wang | ...................... | C07C 29/48 |

OTHER PUBLICATIONS

Wang et al. (Ren. Eng., 52, 556-562, 2014) (Year: 2014).*

* cited by examiner

*Primary Examiner* — Kevin M Bernatz
(74) *Attorney, Agent, or Firm* — MH2 Technology Law Group LLC

(57) ABSTRACT

A gas diffusion electrode and a method for fabricating the same is disclosed. The gas diffusion electrode can be deployed in a membrane electrode assembly for various applications. In an example, the method to fabricate the gas diffusion electrode includes preparing an ink comprising carbon supported surface functionalized silver nanoparticles and depositing the ink on an electrically conductive surface.

10 Claims, 12 Drawing Sheets

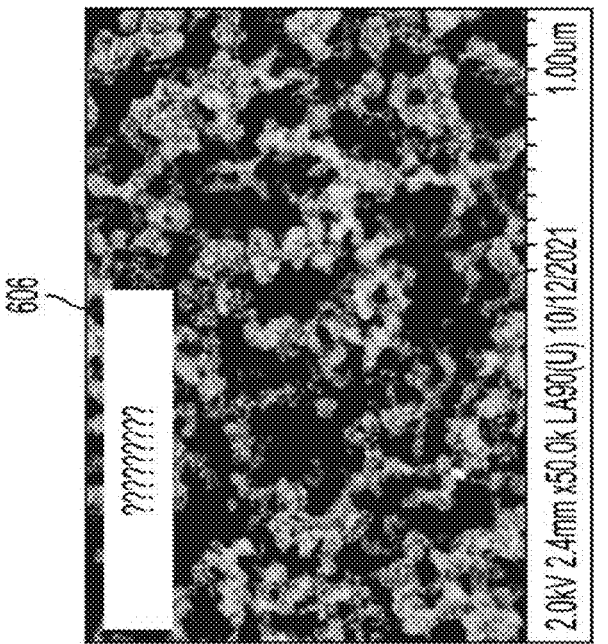
FIG. 6CONT.

CARBON SUPPORTED SURFACE FUNCTIONALIZED SILVER NANOPARTICLES FOR INK/ELECTRODES/MEA

The present disclosure relates generally to the use of carbon surface functionalized silver nanoparticles in an ink, an electrode, and a membrane electrode assembly.

BACKGROUND

The emission of greenhouse gases (GHGs) like $CO_2$ is causing depletion of the earth's ozone layer and the global temperature increase, leading to adverse effects on human health, agriculture, and water resources. To mitigate global climate change, worldwide interest has been focused onto the field of $CO_2$ capture and utilization (CCU), where electro-catalytic conversion of $CO_2$ into value-added chemicals and synthetic fuels is one of the attractive approaches. With appropriate electro-catalysts and reaction conditions including overpotential, reaction temperature, and electrolyte, etc., $CO_2$ can be electrochemically converted into various products such as carbon monoxide (CO), methane ($CH_4$), ethylene ($C_2H_4$), formic acid (HCOOH), methanol ($CH_3OH$) and ethanol ($C_2H_5OH$), etc.

At the current stage, electrochemical conversion of $CO_2$ into CO is one of the most promising reactions, due to its high technological and economic feasibility. In this reaction, syngas (CO and $H_2$) can be generated in an energy-efficient way and then used as feedstocks to produce synthetic hydrocarbons via a Fischer-Tropsch synthesis process.

SUMMARY

According to aspects illustrated herein, there is provided a membrane electrode assembly and a method for fabricating a gas diffusion electrode for the membrane electrode assembly. One disclosed feature of the embodiments is a method comprising preparing an ink comprising carbon supported silver nanoparticles and depositing the ink on an electrically conductive surface.

Another disclosed feature of the embodiments is an electrode. The electrode comprises an electrically conductive surface and carbon supported surface functionalized silver nanoparticles on the electrically conductive surface.

Another disclosure feature of the embodiments is a membrane electrode assembly. The membrane electrode assembly comprises a cathode, the cathode comprising carbon supported surface functionalized silver nanoparticles deposited on an electrically conductive surface, an anion exchange membrane coupled to the cathode, and an anode coupled to the anion exchange membrane.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
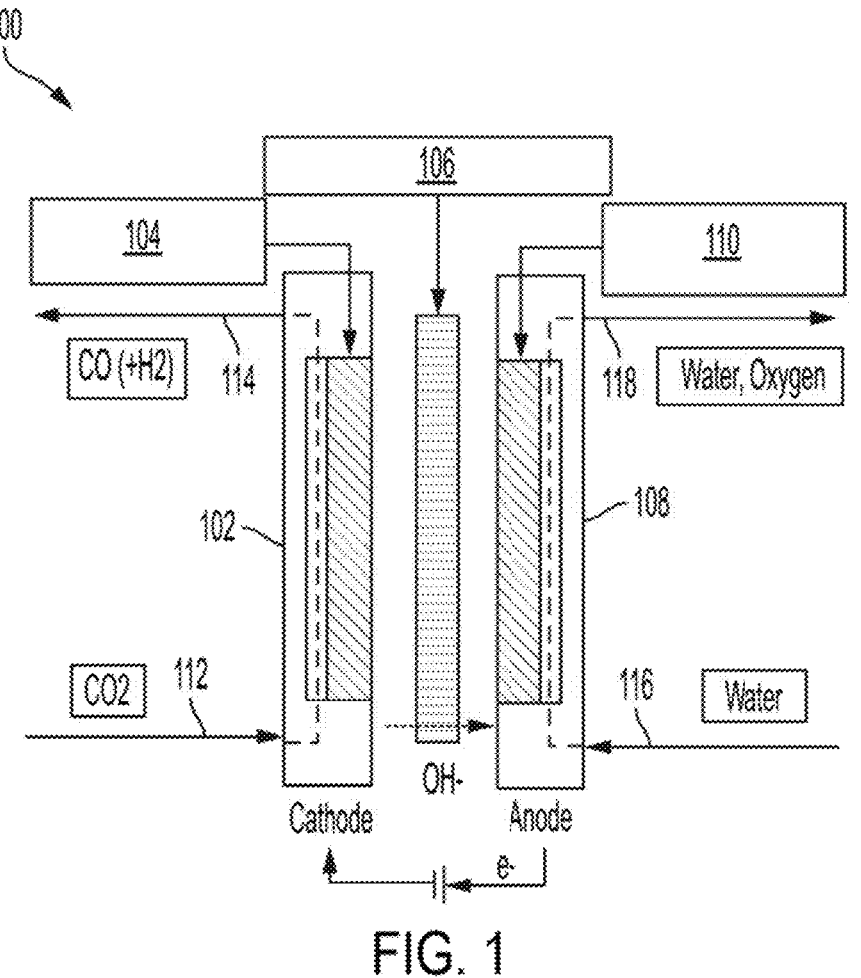
FIG. 1 illustrates an exploded block diagram of an example membrane electrode assembly with a gas diffusion electrode of the present disclosure.

The present disclosure broadly discloses an example gas diffusion electrode with microporous carbon structures impregnated with organo-functionalized silver nanoparticles that are synthesized in-situ and a method for fabricating the same. As discussed above, there is worldwide interest in CCU using electro-catalytic conversion of $CO_2$ into value-added chemicals and synthetic fuels.

The key to the electrochemical conversion process is the electro-catalysts with high efficiency and selectivity, as well as long-term stability. Recent years have witnessed significant advances in the development of electro-catalysts that can selectively reduce $CO_2$ to CO, including Au, Ag, Zn, Pd, and Ga, etc. Among all the candidates, silver shows the highest potential for large-scale applications, owning to its moderate cost and high catalytic selectivity for CO production. Despite the extensive study on Ag-based electrocatalysts, challenges remain in developing materials with enhanced catalytic selectivity at reduced overpotentials, in a simple, scalable, and cost-efficient way.

The present disclosure uses carbon supported surface functionalized silver nanoparticles that are formed in-situ in embodiments. Surface functionalized silver nanoparticles can be deposited or grown in-situ on a carbon structure. In embodiments, the term "in-situ" refers to the presence of the carbon structure (that is, carbon support) in the same liquid-containing composition that the silver nanoparticles are synthesized/prepared in. In contrast, previous "ex-situ" methods removed the synthesized/prepared silver nanoparticles from the liquid-containing composition that the silver nanoparticles were synthesized/prepared in for their potential further processing. In embodiments, the carbon support may be added to the liquid-containing composition containing the silver nanoparticles during the process of surface functionalization of the silver nanoparticles or immediately after the surface functionalization process of the silver nanoparticles.

"Carbon supported" is understood to mean that the surface functionalized silver nanoparticles are on the surface of the carbon structure. The carbon structure may be larger than the surface functionalized silver nanoparticles. For example, the carbon structure can be 50-100 nanometers (nm) in diameter compared to the surface functionalized silver nanoparticles that can be about 5-20 nm in diameter. Thus, the smaller silver nanoparticles can be formed on the surface of the carbon structure.

The in-situ synthesized carbon supported surface functionalized silver nanoparticles can be used as the electrocatalysts in the gas diffusion electrode for electro-catalytic conversion of $CO_2$. Nanostructured silver catalysts have shown improved performance compared to their bulk counterparts, as they offer mass-transport advantages and more highly active sites on the edges and corners of the nanomaterials. By tuning nanomaterial composition, size, morphology, porosity, and surface modification, nanostructured catalyst behaviors can be adjusted for specific applications.

Surface modification is one of the effective approaches to improve catalytic performance. Studies have suggested that functional molecules can decrease the overpotential or improve CO selectivity, e.g., amine-capped Ag nanoparticles show better catalytic performance through stabilizing the COOH* intermediate.

Integration of such electro-catalysts into the Membrane Electrode Assembly (MEA) is another key step to obtain desirable products. A typical MEA comprises two gas diffusion layers (GDLs) and an ion exchange membrane with catalyst particles dispersed at the interface, and the MEA production is similar to the various roll-to-roll production methods utilized in printing. Despite the great effort in developing MEAs for $CO_2$ conversion systems, it remains challenging to fabricate MEAs with low cost, high standard performance, and tunable properties.

The present disclosure provides a scalable approach to prepare MEAs for electrochemical reduction using microporous carbon structures with surface functionalized silver nanoparticles that are deposited or grown in-situ as electrocatalysts that are efficient and selective. Microporous carbon structures with surface functionalized silver nanoparticles are synthesized in-situ and formulated into catalyst inks which are deposited on GDLs via continuous print/coating methods. Although microporous carbon structures are provided as examples herein and provide better performance for MEAs, it should be noted that the carbon structures may also be non-porous.

The in-situ synthesized carbon supported surface functionalized silver nanoparticles may reduce the silver loading by up to 20 times compared to the amount of silver loading for unsupported silver nanoparticles and even improve over carbon supported surface functionalized silver nanoparticles that are formed ex-situ or via an impregnation method. The in-situ synthesized carbon supported surface functionalized silver nanoparticles may also have smaller average diameters. For example, the average diameter of the in-situ synthesized carbon supported surface functionalized silver nanoparticles may be from about 6-8 nanometers and have a range of diameters from about 2 to about 18 nanometers. The fabrication of MEAs with high Faradic efficiency and selectivity for CO are demonstrated under relatively low overpotentials.

FIG. 1 illustrates an example membrane electrode assembly 100 that includes a gas diffusion electrode 104 of the present disclosure. The membrane electrode assembly 100 may be part of a flow cell electro-catalytic converter that is used to convert a compound into different desirable compounds. The gas diffusion electrode 104 of the present disclosure may provide a scalable electrode that is highly efficient at lower cell potentials (e.g., uses less power to perform the conversion).

One example conversion that can be performed by the membrane electrode assembly 100 is the conversion of carbon dioxide ($CO_2$) into carbon monoxide (CO) and hydrogen gas ($H_2$). However, it should be noted that the gas diffusion electrode 104 may be used for electro-catalytic conversion of other types of compounds within the context of flow cell electro-catalytic converters.

In one embodiment, the membrane electrode assembly 100 includes a cathode 102 having the gas diffusion electrode 104, an anion exchange membrane 106, and an anode 108 with an iridium-oxide electrode 110. In one embodiment, an inlet 112 may feed $CO_2$ through the cathode 104 and an outlet 114 may carry the CO and $H_2$ away from the cathode 104. An inlet 116 may feed water through the anode 110 and an outlet may carry water and oxygen away from the anode 108.

In one embodiment, a reference voltage 114 may be applied to assist in the conversion of the $CO_2$ into CO and $H_2$. For example a cell potential may be applied to the membrane electrode assembly 100 via the reference voltage to perform the electro-catalytic conversion. The examples discussed herein applied a cell potential or overpotential of 2.80 Volts (V) to 3.80 (V). In an example, the applied cell potential or overpotential may be approximately 3.20 (V).

In one embodiment, the gas diffusion electrode 104 may be fabricated with microporous carbon structures with surface functionalized silver nanoparticles that are synthesized in-situ, as described herein. Details of the methods to fabricate the gas diffusion electrode 104 are discussed below. The gas diffusion electrode 104 may be fabricated by coating a carbon substrate with a catalyst ink formulated with in-situ synthesized surface functionalized silver nanoparticle carbon particles and then drying the catalyst ink.

In one embodiment, the gas diffusion electrode 104 of the present disclosure may have a Faradic efficiency that is greater than 70% with a selectivity that is greater than 98% at overpotentials or a cell potential less than 3.50 V. The gas diffusion electrode 104 may have a single pass conversion rate of $CO_2$ to CO of greater than 35% at a cell potential less than 3.50V. The gas diffusion electrode 104 may have a current density of greater than 150 milliamps per square centimeter ($mA/cm^2$) at a cell potential between 3.00 V to 3.50 V. The gas diffusion electrode 104 may have an energetic efficiency of greater than 29% at a cell potential of 3.20 V. A comparison of the various performance parameters of the gas diffusion electrode 104 with impregnated microporous carbon structures and without is illustrated in FIGS. 7-11 and discussed in further detail below with reference to examples provided herein.

In one embodiment, the ion exchange member 106 may be a Dioxide Materials Sustainion X37-50-RT activated with potassium hydroxide (KOH) and rinsed with deionized water. The anode 110 may be an iridium oxide ($IrO_2$) coated carbon substrate with the catalyst facing up or towards the ion exchange member 106.

In one embodiment, the anolyte may be potassium bicarbonate ($KHCO_3$). The catholyte flow chamber may capture the CO and $H_2$ converted from the $CO_2$ provided by the carbon dioxide flow chamber 102. As noted above, the membrane electrode assembly may be used in a flow cell electro-catalytic converter system. Although various examples are provided for the anolyte, the anode 110, and the ion exchange membrane 108, it should be noted that other materials may be deployed.

Figure 2:
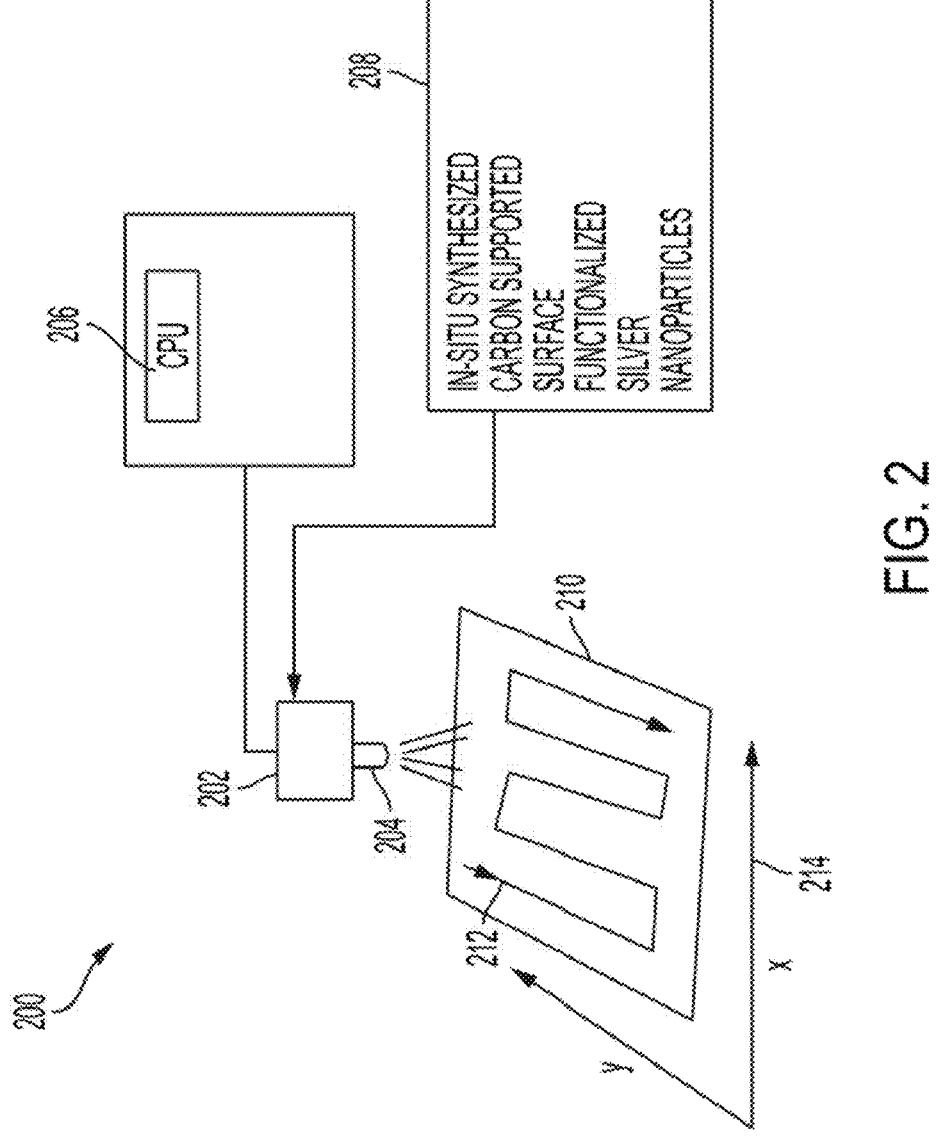
FIG. 2 illustrates a block diagram of an example printer used to spray in-situ synthesized surface functionalized silver nanoparticle carbon particles onto a carbon substrate to fabricate the gas diffusion electrode of the present disclosure.

FIG. 2 illustrates a block diagram of an example printer 200 that can be used to spray in-situ synthesized carbon supported surface functionalized silver nanoparticles 208 that are prepared for fabrication of the gas diffusion electrode 104.

In one embodiment, the in-situ synthesized carbon supported surface functionalized silver nanoparticles 208 may be prepared by mixing silver acetate with organic moieties or nitrogen containing moieties and a microporous carbon structure in-situ. For example, a compound having small organic molecules or nitrogen molecules can attach to the surface of the silver particles. In one embodiment, the organic molecules may include compounds amino acids, or organic acids (e.g., mercaptoacetic acid, malic acid, oleic acid, and the like).

In embodiments, the nitrogen containing moiety may include an amine, an amide, an imide, or a nitrogen containing aromatic compound. The amine may be a primary amine, a secondary amine, or a tertiary amine. Examples of primary amines may include hexylamine, heptylamine, octylamine, nonylamine, decylamine, undecylamine, dodecylamine, and the like. Examples of secondary amines may include piperidine, pyrrolidine, dipropylamine, dibutylamine, dipentylamine, dihexylamine, diheptylamine, dioctylamine, dinonylamine, didecylamine, diisopropylamine, and the like. Examples of tertiary amines may include diisopropylethylamine, triethylamine, diethylmethylamine, tripropylamine, tributylamine, tripentylamine, trihexylamine, triheptylamine, trioctylamine, trinonylamine, tridecylamine triundecylamine, tridodecylamine, and the like.

Example amides may include propanoamide, butanoamide, pentanoamide, hexanoamide, benzamide, N-methylbutanamide, N-ethylbutanamide, glutamine, asparagine, and the like. Example imides may include succinimide, maleimide, glutarimide, phthalimide, and the like. Example nitrogen containing aromatic compounds may include pyridine, 4-methylpyridine, 4-ethylpyridine, 4-propylpyridine, pyrrole, imidazole, 4-methylimidazole, and the like.

In one embodiment, functionalizing the silver nanoparticles may refer to changing nanomaterial properties to add certain functionality through assembling different organic or nitrogen containing materials via covalent or noncovalent bonds, such as hydrogen bonds, electrostatic force, van der Waals force, and the like.

In one embodiment, the in-situ synthesized carbon supported surface functionalized silver nanoparticles 208 may be prepared with dodecylamine. Thus, the silver nanoparticles can be functionalized to bond with a carbon substrate in-situ by attaching dodecylamine to the silver nanoparticles through noncovalent bonds. For example, the nitrogen molecule can be coordinated to the silver molecules to form the noncovalent bonds. The silver nanoparticles can be bonded with the carbon substrate via an in-situ deposition method or an in-situ growth method. Example 1 below describes an example of the in-situ synthesis of the carbon supported surface functionalized silver nanoparticles 208 via the in-situ deposition method.

Example 1

To a 1 Liter (L) necked round bottom flask, fitted with an overhead stirring system, thermometer, and argon (Ar) line, was added (155.67 grams (g), mol) melted dodecylamine.

The reaction flask was immersed in a 35° C. water bath and stirring was set to 300 rotations per minute (RPM). Methanol (10.5 milliliters (mL)) was then added to the flask followed by 52 mL of decalin.

Phenyl hydrazine (11.3 g, 0.1048 mol) was then added with stirring and the temperature was stabilized at 35° C. Silver acetate powder (35 g, 0.2097 mol) was slowly added to the mixture, keeping the reaction temperature between 35° C. to 37° C. Stirring slowly ramped up to 500 RPM over silver acetate addition. Once the entirety of silver acetate was added, the reaction was brought to 40° C. and stirred for 1 hour.

After 1 hour, 35.7 g ov Vulcan XC72 carbon black dispersed in 200 mL of decalin was added slowly to the reaction mixture. The mixture was stirred at 40° C. for 2 hours. After the 2 hours of stirring, 400 mL of methanol was added and stirred for 15 minutes.

Precipitate was filtered on a Buchner funnel with 2 filter media added (Whatman 934AH glass fiber paper on bottom, Whatman #54 filter paper on top). Filtration afforded a black paste which was reslurried in 200 mL methanol for 15 minutes and filtered. Washing was repeated one additional time and dried under vacuum for 15 minutes to give a black wetcake. The material was then transferred to an amber bottle, purged with Ar, and dried in a vacuum oven at room temperature overnight to give silver nanoparticle coated carbon black powder (57 g).

In one embodiment, the in-situ deposition method was shown to grow surface functionalized silver nanoparticles with a relatively small average diameter. For example, the average diameter of the surface functionalized silver nanoparticles that were synthesized with the in-situ deposition method were found to be approximately 7 nanometers (nm) to approximately 8 nm. In an example, the average diameter was approximately 7.22 nm with a standard deviation of 3.69. The surface functionalized silver nanoparticles were found to have a range of diameters from approximately 2 nm to approximately 18 nm.

Example 2 below describes an example of the in-situ synthesis of the carbon supported surface functionalized silver nanoparticles 208 via the in-situ growth method.

Example 2

To a 1 Liter (L) necked round bottom flask, fitted with an overhead stirring system, thermometer, and argon (Ar) line, was added (155.67 grams (g), mol) melted dodecylamine. The reaction flask was immersed in a 35° C. water bath and stirring was set to 300 rotations per minute (RPM). Methanol (10.5 milliliters (mL)) was then added to the flask followed by 52 mL of decalin.

Next, 35.7 g of Vulcan XC72 carbon black was added along with 200 mL of a 5:1 decalin:methanol solution. The mixture was stirred at 500 RPM for 15 minutes until the carbon black was sufficiently dispersed.

Phenyl hydrazine (11.3 g, 0.1048 mol) was then added with stirring and the temperature was stabilized at 35° C. Silver acetate powder (35 g, 0.2097 mol) was slowly added to the mixture, keeping the reaction temperature between 35° C. to 37° C. Stirring slowly ramped up to 500 RPM over silver acetate addition. Once the entirety of silver acetate was added, the reaction was brought to 40° C. and stirred for 1 hour. After the 1 hour of stirring, 400 mL of methanol was added and stirred for 15 minutes.

Precipitate was filtered on a Buchner funnel with 2 filter media added (Whatman 934AH glass fiber paper on bottom, Whatman #54 filter paper on top). Filtration afforded a black paste which was reslurried in 200 mL methanol for 15 minutes and filtered. Washing was repeated one additional time and dried under vacuum for 15 minutes to give a black wetcake. The material was then transferred to an amber bottle, purged with Ar, and dried in a vacuum oven at room temperature overnight to give silver nanoparticle coated carbon black powder (57 g).

In one embodiment, the in-situ growth method was shown to grow surface functionalized silver nanoparticles with a relatively small average diameter. For example, the average diameter of the surface functionalized silver nanoparticles that were synthesized with the in-situ growth method were found to be approximately 6 nm to approximately 7 nm. In an example, the average diameter was approximately 6.29 nm with a standard deviation of 4.16. The surface functionalized silver nanoparticles were found to have a range of diameters from approximately 2 nm to approximately 15 nm.

The term "average particle size" (or "average diameter") as used herein may refer to the volume-based median particle diameter (e.g., the particle diameter below which 50% by volume of the particle population is found). Particle diameters and particle size distributions may be determined by laser diffraction in accordance with ISO 13320:2009. In one embodiment, ImageJ software was used to analyze the silver particle size. The diameter of the particles were measured using a straight line length measurement tool on the pixels of the image. The scale bar was measured in pixels and used to convert the diameter values to nanometers. Fifteen random particles were measured for each TEM image and the averaged values were reported with standard deviation.

Figure 5:
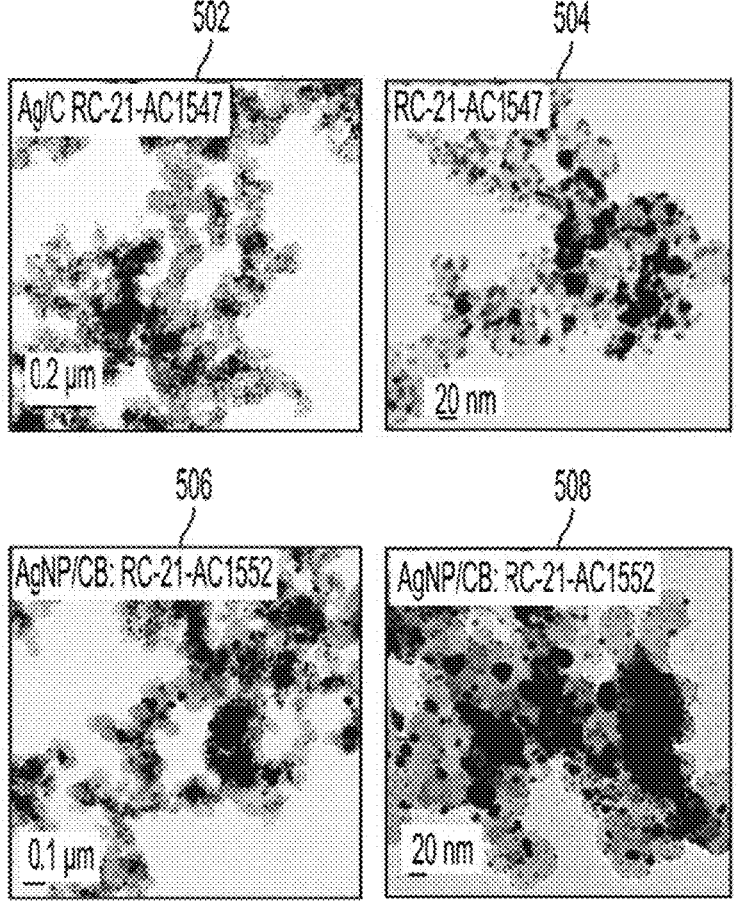
FIG. 5 illustrates TEM images of surface functionalized microporous carbon structures impregnated with surface functionalized silver nanoparticles formed via different in-situ methods.

FIG. 5 illustrates transmission electron microscopy (TEM) images of the carbon surface functionalized silver nanoparticles that were prepared via the in-situ deposition method and the in-situ growth method described above. Images 502 and 504 illustrate different magnifications of the carbon surface functionalized silver nanoparticles prepared via the in-situ deposition method. Images 506 and 508 illustrate different magnifications of the carbon surface functionalized silver nanoparticles prepared via the in-situ growth method. The black dots in the images 502, 504, 506, and 508 represent the silver nanoparticles, and the lighter grey areas represent the carbon black support structure.

The TEM images 502, 504, 506, and 508 illustrate how the silver nanoparticles were successfully integrated into the carbon black supports for both in-situ deposition and in-situ growth methods. The images 502 and 504 show a more even distribution via the in-situ deposition method compared to the in-situ growth method.

The in-situ synthesized carbon supported surface functionalized silver nanoparticles 208 may then be prepared into an ink form that can be dispensed by a printhead 202 with a spray nozzle 204 that is under the control of a central processing unit (CPU) 206 (also referred to as a processor or controller). The in-situ synthesized carbon supported surface functionalized silver nanoparticles 208 may be mixed with a polar or non-polar solvent to prepare the ink. Examples of the polar solvent may include ethanol, isopropanol, butanol, water, and the like. Examples of the non-polar solvent may include toluene, decalin, benzene, hexane, and the like. In one embodiment, several polar solvents, several non-polar solvents, or a combination of both polar solvents and non-polar solvents may be used to prepare the ink. For example, the solvent can be water and isopropyl alcohol, with a ratio from 90:10 to 10:90. In another example, the solvent may be pure isopropyl alcohol. The solid concentration of the surface functionalized silver nanoparticles 208 may range from 0.1 wt % to 5 wt %.

The printhead 202 may move along an x-y coordinate system 214 to distribute the carbon supported surface functionalized silver nanoparticles 208 across the surface of the substrate 210. Example 3 describes an example of how the in-situ synthesized carbon supported surface functionalized silver nanoparticles 208 are prepared into an ink form.

Example 3

The cathode catalyst ink was prepared by mixing 225 mg of the above in-situ synthesized carbon supported silver nanoparticle, described in Examples 1 and 2 above, powder with 30.0 ml of toluene. The ink was ultra-sonicated for 60 min for complete mixing. The silver loading was approximately 0.34%.

The in-situ synthesized carbon supported surface functionalized silver nanoparticles 208 in an ink form may then be printed onto a substrate 210. The substrate 210 may be a carbon substrate. The in-situ synthesized carbon supported surface functionalized silver nanoparticles 208 may be printed by spraying the substrate 210 with the in-situ synthesized carbon supported surface functionalized silver nanoparticles 208 in an ink form.

In one example, the in-situ synthesized carbon supported surface functionalized silver nanoparticles 208 in an ink form were spray coated with an ultrasonic spray coater with nitrogen flow gas at 34 kilopascals (kPa) at 0.17 cubic meters ($m^3$) delivery per hour at a stand-off distance of 30 millimeters (mm) from a sonic head gas diffusion layer substrate. Sonication power was at 1.5 watts (W) and a conical vortex delivery pattern with 0.3 milliliters per minute (mL/min) ink delivery via a syringe pump. Printing was done via an X-Y ballscrew-stage with fixed Ultrasonic (e.g., Sonotek-Vortex) print head was 60 mm×60 mm zone consisting of a serpentine path of 12 lines with a 5 mm spacing gap between them at a linear speed of 25 mm per second (mm/sec). The ink was stirred using a string bar in the syringe.

After the in-situ synthesized carbon supported surface functionalized silver nanoparticles 208 are prepared in an ink form and printed onto the substrate 210, the in-situ synthesized carbon supported surface functionalized silver nanoparticles 208 on the substrate 210 may be dried at room temperature for 24 hours.

In an example, four different gas diffusion electrodes 104 were prepared for comparison to a gas diffusion electrode formed with unsupported silver nanoparticles. A first electrode received 15 passes of the in-situ synthesized carbon supported surface functionalized silver nanoparticles 208 formed via the in-situ deposition method. A second electrode received 15 passes of the in-situ synthesized carbon surface functionalized silver nanoparticles 208 formed via the in-situ growth method. A third electrode received 15 passes of carbon supported surface functionalized silver nanoparticles formed via an impregnation method. A fourth electrode was prepared with unsupported silver nanoparticles. FIGS. 7-11 illustrate image comparisons of the different fabricated electrodes and the comparative performance of each electrode compared to gas diffusion electrodes fabricated with unsupported surface functionalized silver nanoparticles (e.g., without any carbon supporting microstructure).

Figure 6:
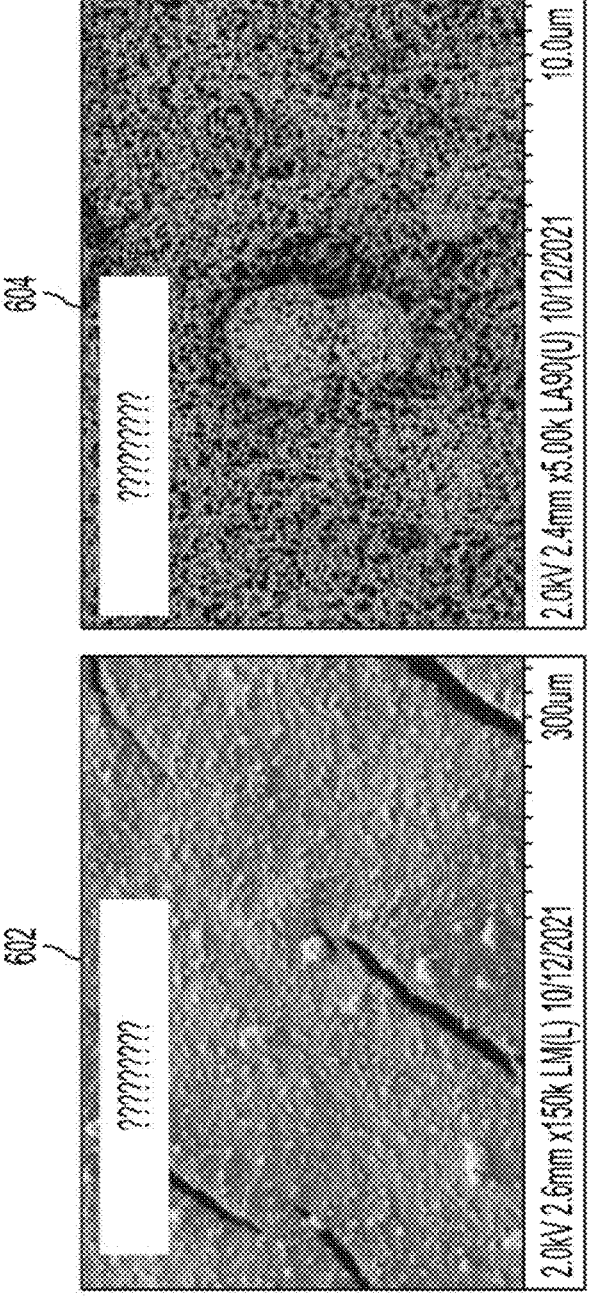
FIG. 6 illustrates SEM images of example gas diffusion electrodes formed with in-situ synthesized carbon supported surface functionalized silver nanoparticles at various magnifications.

FIG. 6 illustrates scanning electron microscope (SEM) images 602, 604, and 606 at different magnifications of the first electrode formed with the in-situ synthesized carbon surface functionalized silver nanoparticles 208 that were prepared via the in-situ deposition method. The image 602 has the least amount of magnification and the image 606 has the most amount of magnification. The images 602, 604, and 606 illustrate a relatively uniform distribution of the in-situ synthesized carbon surface functionalized silver nanoparticles 208 on the surface of the electrode.

Figure 7:
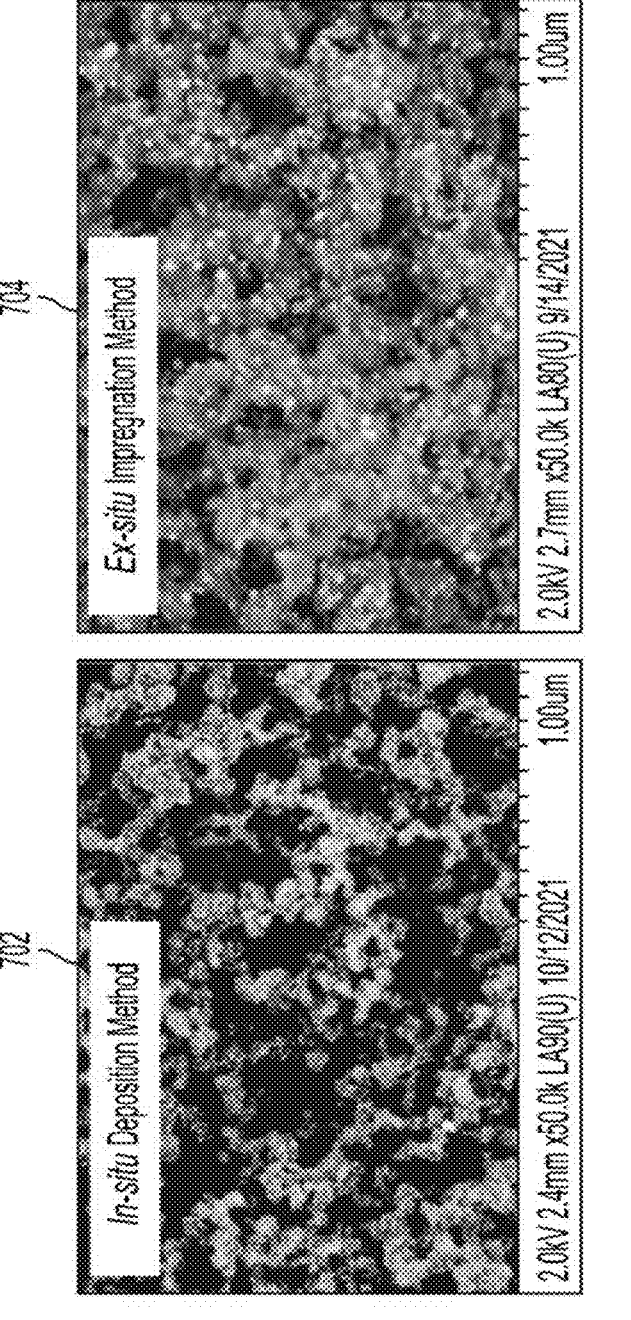
FIG. 7 illustrates SEM images of to compare an example gas diffusion electrodes formed with in-situ synthesized carbon supported surface functionalized silver nanoparticles to an example gas diffusion electrode formed with ex-situ synthesized carbon supported surface functionalized silver nanoparticles.

FIG. 7 illustrates a SEM image 702 at 50,000 times magnification of the gas diffusion electrode formed with the carbon surface functionalized silver nanoparticles prepared via the in-situ deposition method and a SEM image 704 at times magnification of a gas diffusion electrode formed with carbon surface functionalized silver nanoparticles prepared via a previously used impregnation method or ex-situ methods. As can be seen in the images 702 and 704, the gas diffusion electrode in the image 702 has a more uniform distribution of the silver nanoparticles than the silver nanoparticles on the gas diffusion electrode in the image 704. Thus, the gas diffusion electrode with the in-situ synthesized carbon surface functionalized silver nanoparticles 208 provides better electro-catalytic performance than the gas diffusion electrode in the image 704. In addition, the in-situ synthesized carbon surface functionalized silver nanoparticles 208 can be prepared faster than using the previous impregnation or ex-situ methods. The comparison of the performance of the example electrodes are illustrated in FIGS. 8-11 and discussed below.

Figure 8:
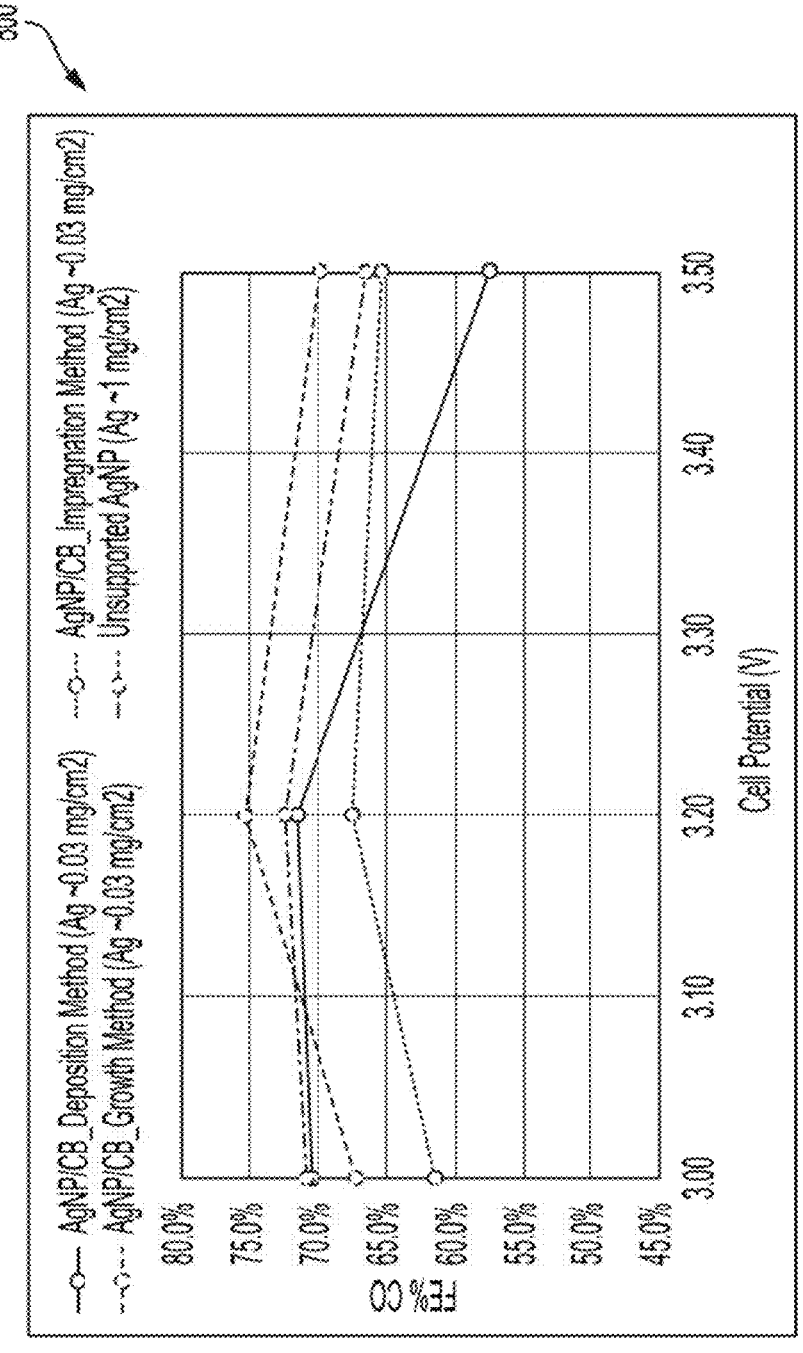
FIG. 8 illustrates a graph of Faradaic efficiency versus cell potential for various microporous carbon structures.

FIG. 8 illustrates a graph 800 of the Faradic efficiency versus cell potential for the four example electrodes described above. As noted above, the silver loading of the electrode without the microporous carbon support structure is much higher (e.g., approximately 1.0 mg/cm$^2$) compared to the two electrodes with the in-situ synthesized microporous carbon support structures as wells as the microporous carbon structure with the silver nanoparticles prepared via the impregnation method (e.g., less than 0.1 mg/cm$^2$ or approximately 0.03 mg/cm$^2$).

The Faradic efficiency is a measure of the specific electron efficiency participating in the desired electrochemical reaction. As shown in the graph 800 the Faradic selectivity towards carbon monoxide for the electrodes with the in-situ synthesized carbon supported silver nanoparticles (in-situ deposition and in-situ growth) were found to be similar, or slightly higher, than the electrode without the microporous carbon structure through testing in a voltage region between 2.8 V to 3.8 V. The electrodes with the in-situ synthesized carbon supported silver nanoparticles showed a similar trend line as the electrode without the microporous carbon structure through the voltage region between 2.8 V to 3.8 V. However, the electrodes with the in-situ synthesized carbon supported silver nanoparticles showed a Faradic efficiency greater than 70% at 3.2 V.

Figure 9:
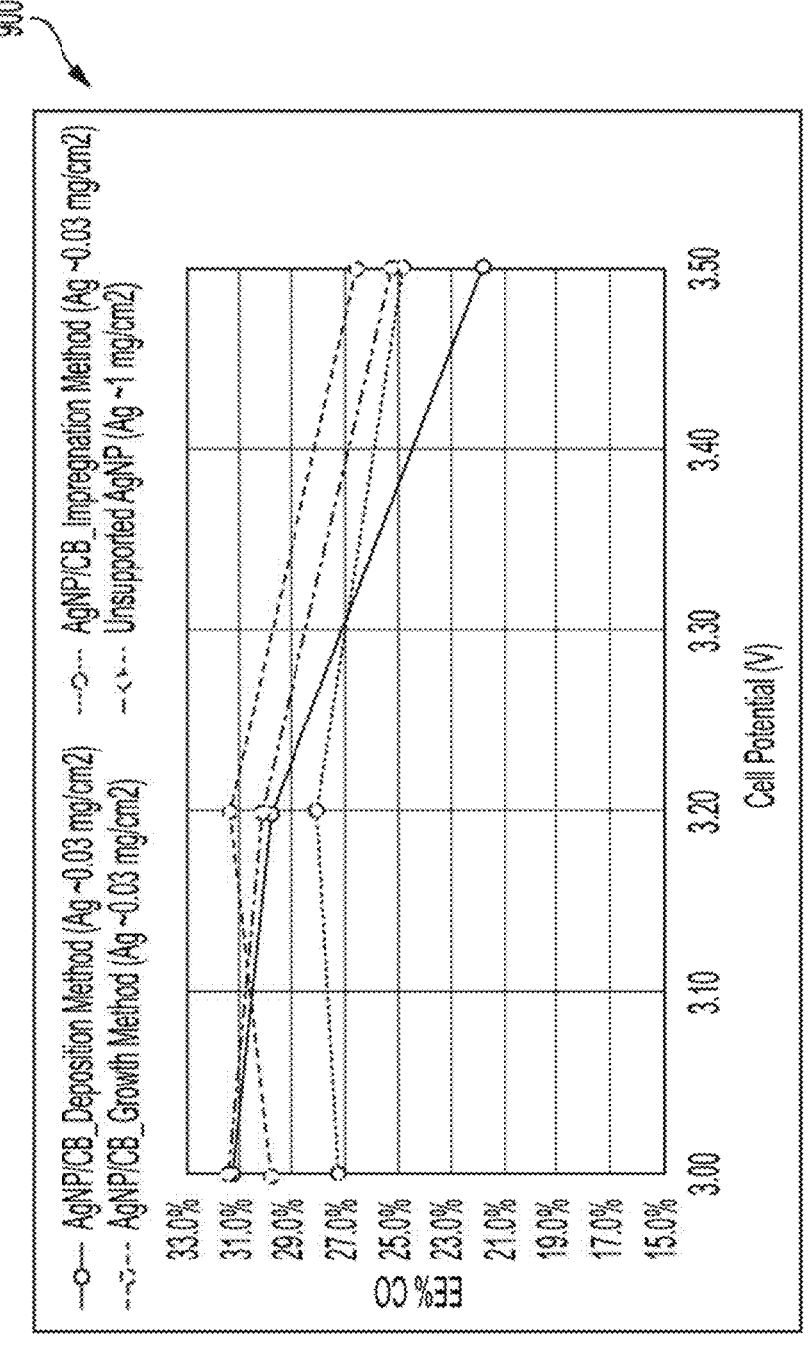
FIG. 9 illustrates energetic efficiency versus cell potential for various microporous carbon structures.

FIG. 9 illustrates a graph 900 of the energetic efficiency versus cell potential for the four example electrodes described above. The energetic efficiency is a measure of the true energy efficiency of the electrochemical conversion process. This is done by the multiplication of the Faradaic efficiency with cell overpotential, which yields the actual energy input.

The graph 900 illustrates that the energetic efficiency of the electrodes with the electrodes with the in-situ synthesized carbon supported silver nanoparticles (in-situ deposition and in-situ growth) were found to be similar to, or slightly higher than, the electrode without the microporous carbon structure through testing in a voltage region between 2.8 V to 3.8 V. The electrodes with the in-situ synthesized carbon supported silver nanoparticles (in-situ deposition and in-situ growth) showed a similar trend line to the electrode without the microporous carbon structure through the voltage region between 2.8 V to 3.8 V. The electrodes with the in-situ synthesized carbon supported silver nanoparticles (in-situ deposition and in-situ growth) showed an energetic efficiency of greater than 29% at the cell potential of 3.2 V.

Figure 10:
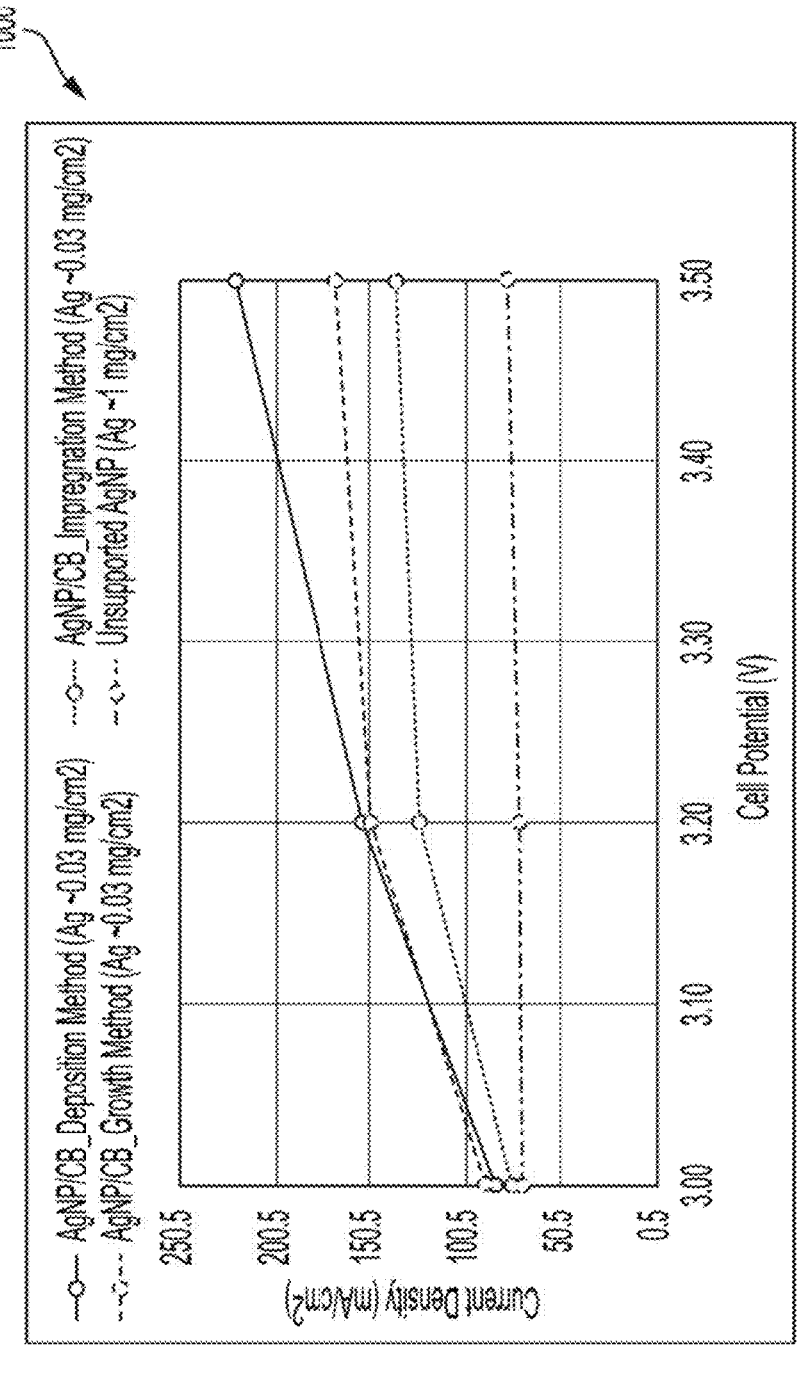
FIG. 10 illustrates current density versus cell potential for various microporous carbon structures.

FIG. 10 illustrates a graph 1000 of the current density in mA/cm$^2$ versus cell potential for the four example electrodes described above. The current density is a measure of the amount of charge that can to be applied to the cell and is directly related to the maximum throughput or conversion rate. This makes the current density a critical factor when considering the scale-up economics of CO$_2$ electrolysis.

The graph 1000 illustrated that at 3.20 V, the electrodes with the in-situ synthesized carbon supported silver nanoparticles (in-situ deposition and in-situ growth) had the highest current density, followed by the electrode with the microporous carbon structure prepared via the impregnation method, and then the electrode with the untreated microporous carbon structure. Graph 1000 illustrates that the current density improves as the voltage increases for the electrodes with the in-situ synthesized carbon supported silver nanoparticles (in-situ deposition and in-situ growth). The electrode with the untreated microporous carbon structure did not exhibit as good a performance as the electrodes with the in-situ synthesized carbon supported silver nanoparticles (in-situ deposition and in-situ growth). The electrodes with the in-situ synthesized carbon supported silver nanoparticles (in-situ deposition and in-situ growth) showed a current density of greater than 150 mA/cm$^2$ at a cell potential of 3.20 V.

Figure 11:
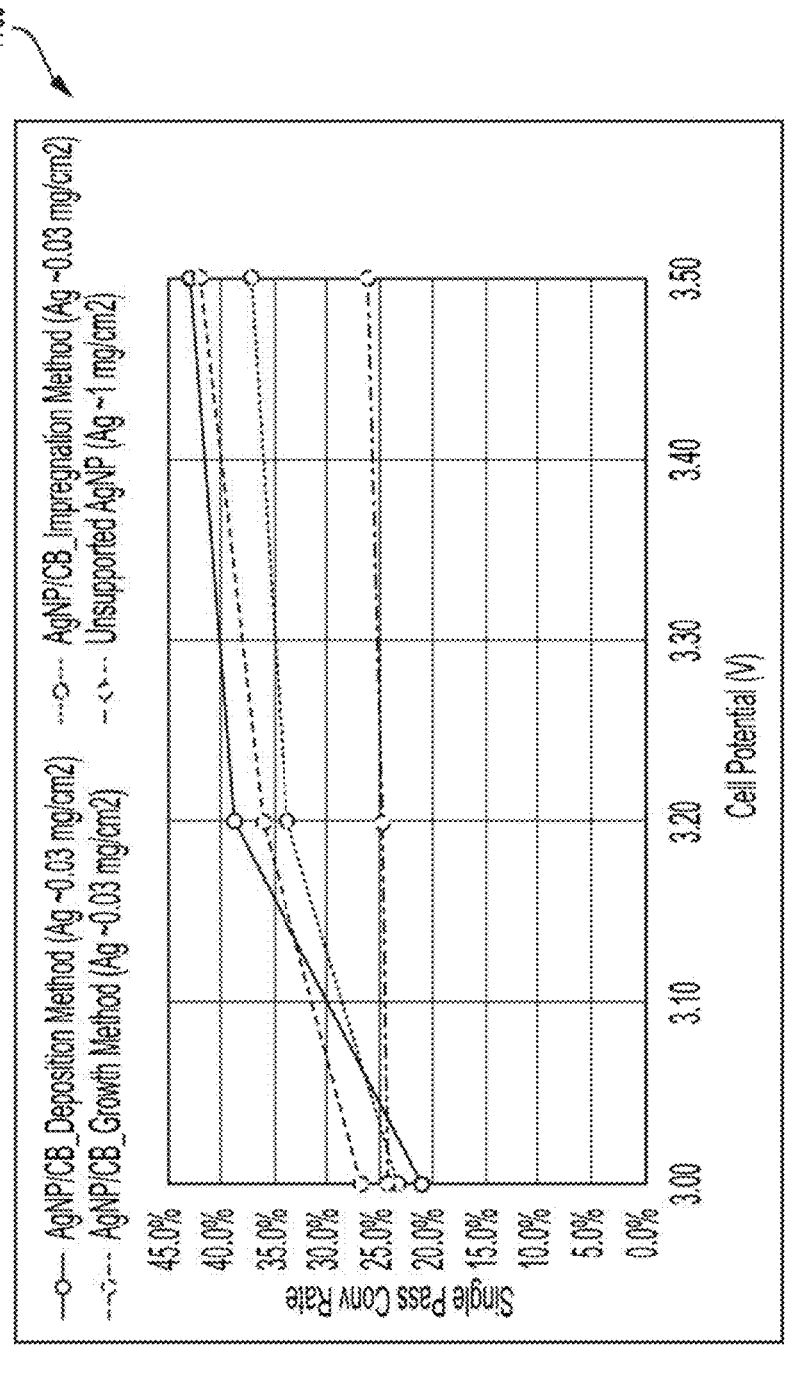
FIG. 11 illustrates single pass conversion rates versus cell potential for various microporous carbon structures.

FIG. 11 illustrates a graph 1100 of the single pass conversion rate versus cell potential for the four example electrodes described above at different sintered conditions. The single pass conversion rate is a performance metric often related to scale-up economics of conversion systems. In this instance, the outlet CO flow rate is measured and used to calculate the molar conversion percentage of the input CO$_2$.

The graph 1100 illustrates that the electrodes with the in-situ synthesized carbon supported silver nanoparticles (in-situ deposition and in-situ growth) had the higher single pass conversion rates, followed by the electrode prepared with the carbon supported silver nanoparticles via the impregnation method and the electrode without any microporous carbon structure, and then followed by the electrode with the acid treated microporous carbon structure. Graph 1100 illustrates that the single pass conversion rate increases for all electrodes as the voltage is increased. The electrodes with the in-situ synthesized carbon supported silver nanoparticles (in-situ deposition and in-situ growth) showed a single pass conversion rate of greater than 35% at cell potentials between 3.20V.

Based on an evaluation of the catalytic performance characteristics of the various electrodes, it was found that the electrodes with the in-situ synthesized carbon supported silver nanoparticles (in-situ deposition and in-situ growth) can provide comparable target catalytic performance to the electrode without the impregnated microporous carbon structure. For example, the electrodes with the in-situ synthesized carbon supported silver nanoparticles (in-situ deposition and in-situ growth) of the present disclosure can provide the same target catalytic performance level compared to another electrode having surface functionalized silver nanoparticles that are not carbon supported. In addition, the silver loading of the electrode of the present disclosure is 20 times or more lower compared to another electrode having surface functionalized silver nanoparticles that are not carbon supported (e.g., approximately 0.03 mg/cm$^2$ vs 0.1 mg/cm$^2$).

The more desirable catalytic behavior can be explained by the enhanced interaction between the silver and carbon support. To be more specific, strong acids, such as HNO$_3$, have been reported to activate carbon surfaces, and possibly forming —COOH groups on the carbon surface. Other methods may also be used to activate the carbon surfaces to increase interaction between the silver and the carbon support. For example, other treatments can include plasma treatment, bases, or other types of chemical treatments. Silver nanoparticles have strong interactions with the carboxylic acid and carbonyl groups present on the activated carbon surfaces, leading to better electron transfer properties and, thus, better catalytic performance.

In addition, the more uniform distribution of the silver nanoparticles found in the in-situ synthesized carbon supported surface functionalized silver nanoparticles may also help achieve more desirable catalytic behavior. For example, the uniform distribution helps to provide more surface area of the carbon surface that can be activated.

Figure 3:
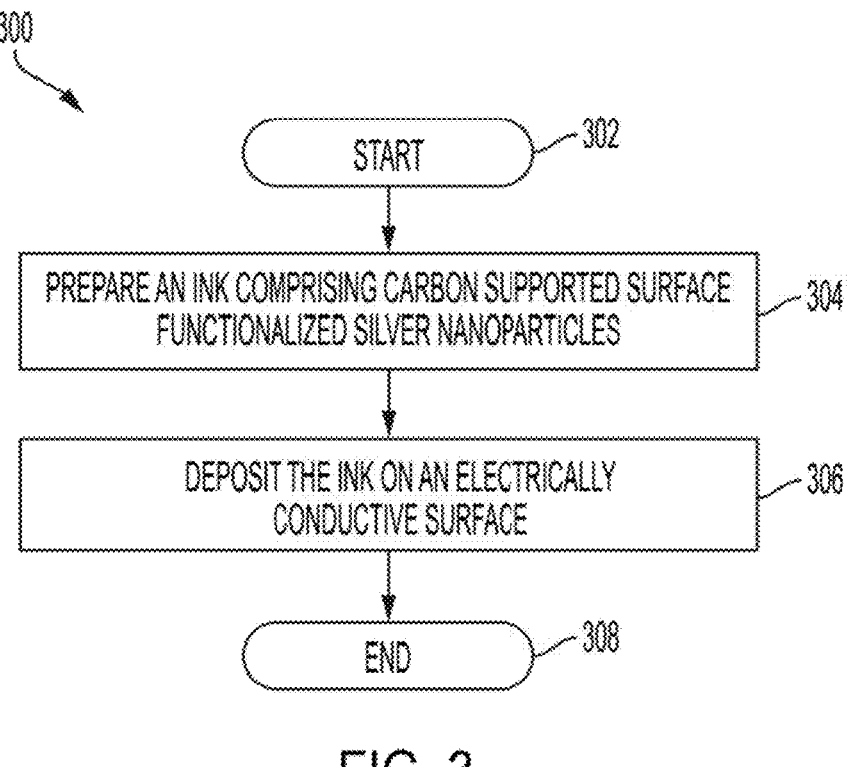
FIG. 3 illustrates a flowchart of an example method for fabricating a gas diffusion electrode of the present disclosure.
Figure 4:
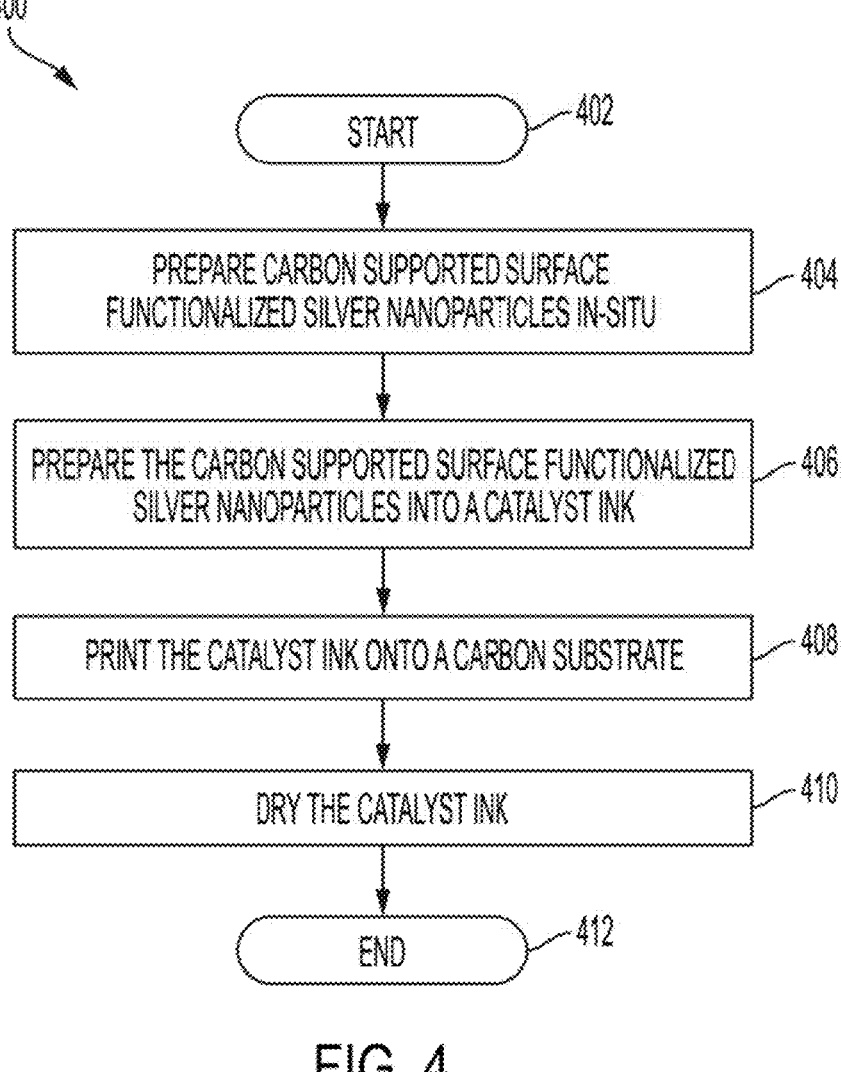
FIG. 4 illustrates a flowchart of another example method for fabricating a gas diffusion electrode of the present disclosure.

FIGS. 3 and 4 illustrates flowcharts of example methods 300 and 400, respectively, for fabricating a gas diffusion electrode of the present disclosure. In one embodiment, one or more blocks of the methods 300 and 400 may be performed by various tools or machines under the control of a central controller or processor (e.g., the printer 200) or in combination with manually performed steps to prepare the various compounds described herein.

Referring to method 300 in FIG. 3, at block 302, the method 300 begins. At block 304, the method 300 prepares an ink comprising carbon supported surface functionalized silver nanoparticles. For example, the carbon supported silver nanoparticles can be prepared by presenting a microporous carbon structure with surface functionalized silver nanoparticles in-situ to form surface functionalized silver nanoparticle carbon particles. The in-situ synthesized surface functionalized silver nanoparticles can have an average diameter of approximately 6 nm to approximately 8 nm.

In embodiments, the nitrogen containing moiety may include an amine, an amide, an imide, or a nitrogen containing aromatic compound, all of which are described in detail in the present disclosure above.

In one embodiment, the carbon structures may be mixed in-situ with the liquid-containing composition of functionalized silver nanoparticles, as described by Example 1 above. The carbon structures may be porous or non-porous. In one embodiment using microporous carbon structures, the microporous carbon structures may be mixed with the silver acetate and the compound having the amine functional group via the in-situ growth method, as described by Example 2 above. In one embodiment, the microporous carbon structures may be functionalized with an acid before being prepared in the in-situ deposition method or in-situ growth method. The microporous carbon structures may include carbon black, carbon nanotubes, graphene, and the like.

The ink may then be prepared with the in-situ synthesized carbon supported silver nanoparticles. In one embodiment, the microporous carbon structure with the surface functionalized silver nanoparticles may be prepared as a catalyst ink that can be printed via a spray nozzle controlled by a printhead. For example, the catalyst ink can be sprayed onto the carbon substrate with the movable printhead. The catalyst ink can be formulated with toluene, as described above in Example 3. The catalyst ink can also be applied via other methods, such as slot-die coating, drawdown coating, and the like.

At block 306, the method 300 deposits the ink on an electrically conductive surface. For example, the ink may be a catalyst ink. The catalyst ink can be sprayed or printed onto a carbon substrate. The catalyst ink can be printed in a serpentine pattern to evenly coat the substrate.

The catalyst ink may be dried to form a gas diffusion electrode. In one embodiment, the catalyst ink can be dried at room temperature for 24 hours to form the gas diffusion electrode. The gas diffusion electrode may be assembled as part of a membrane assembly electrode that is deployed in a flow cell electro-catalytic converter. The gas diffusion electrode may perform conversion of CO$_2$ into CO and H$_2$, as described above. At block 308, the method 300 ends.

Referring to the method 400 in FIG. 4, at block 402, the method 400 begins. At block 404, the method 400 prepares carbon supported surface functionalized silver nanoparticles in-situ.

In one embodiment, an in-situ deposition method may be used to prepare the carbon supported surface functionalized silver nanoparticles. The in-situ deposition method may prepare a liquid-containing composition of the surface functionalized silver nanoparticles by mixing silver acetate with a mixture of phenyl hydrazine, methanol, decalin, and dodecylamine. The mixture of the silver acetate powder, phenyl hydrazine, methanol, decalin, and dodecylamine may be heated. The microporous carbon structure may be added to the liquid-containing composition of the surface functionalized silver nanoparticles to synthesize the carbon supported surface functionalized silver nanoparticles via the in-situ deposition method. Details of the preparation are described above in Example 1.

In one embodiment, the microporous carbon structure may be mixed with the silver acetate and an amine containing moiety to synthesize the surface functionalized microporous carbon structure via the in-situ growth method. Details of the preparation are described above in Example 2.

At block 406, the method 400 prepares the carbon supported surface functionalized silver nanoparticles into a catalyst ink. For example, the carbon supported surface functionalized silver nanoparticles may be mixed with toluene while stirring under a constant flow of argon. Details of preparing the catalyst ink with toluene are described above in Example 3.

At block 408, the method 400 prints the catalyst ink onto a carbon substrate. For example, the catalyst ink can be printed or sprayed onto the carbon substrate with nitrogen flow gas in a serpentine path via a spray nozzle controlled by a printhead.

At block 410, the method 400 dries the catalyst ink. For example, the catalyst ink can be dried at room temperature for 24 hours to finalize fabrication of the gas diffusion electrode. In one embodiment, the gas diffusion electrode may be assembled as part of a membrane assembly electrode that is deployed in a flow cell electro-catalytic converter. The gas diffusion electrode may perform conversion of CO$_2$ into CO and H$_2$, as described above. At block 412, the method 400 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An electrode, comprising:

an electrically conductive surface; and carbon supported surface functionalized silver nanoparticles on the electrically conductive surface, wherein the electrode has a target catalytic performance and a silver loading is 20 times or more lower compared to another electrode having a same target catalytic performance and comprising surface functionalized silver nanoparticles that are not carbon supported.

2. The electrode of claim 1, wherein the carbon supported surface functionalized silver nanoparticles have an average diameter ranging from about 2 nanometers (nm) to about 18 nm.

3. The electrode of claim 2, wherein the surface functionalized silver nanoparticles comprises silver nanoparticles that are functionalized with an organic moiety or a nitrogen containing moiety.

4. The electrode of claim 3, wherein the nitrogen containing moiety comprises dodecylamine.

5. A membrane electrode assembly, comprising:

a cathode, the cathode comprising carbon supported surface functionalized silver nanoparticles deposited on an electrically conductive surface, wherein the cathode has a target catalytic performance and a silver loading is 20 times or more lower compared to another electrode having a same target catalytic performance and comprising surface functionalized silver nanoparticles that are not carbon supported;

an anion exchange membrane coupled to the cathode; and an anode coupled to the anion exchange membrane.

6. The membrane electrode assembly of claim 5, wherein the cathode converts carbon dioxide in a carbon dioxide flow chamber at a Faradic efficiency greater than 70% at a cell potential of approximately 3.2 Volts (V) with a selectivity of carbon monoxide at greater than 98%.

7. The membrane electrode assembly of claim 5, wherein a silver loading of the cathode comprises less than 0.1 milligrams per square centimeter ($mg/cm^2$).

8. The membrane electrode assembly of claim 6, wherein the cathode comprises a single pass conversion rate of greater than 35% at the cell potential of 3.2 V.

9. The membrane electrode assembly of claim 6, wherein the cathode comprises a current density of greater than 150 milliamps per square centimeter at the cell potential of 3.2 V.

10. The membrane electrode assembly of claim 6, wherein the cathode comprises an energetic efficiency of greater than 29% at the cell potential of 3.2 V.

* * * * *